United States Patent
Brandstrom

(10) Patent No.: US 10,611,077 B2
(45) Date of Patent: Apr. 7, 2020

(54) FIBER REINFORCED REBAR WITH SHAPED SECTIONS

(71) Applicant: Randel Brandstrom, Edmonton (CA)

(72) Inventor: Randel Brandstrom, Edmonton (CA)

( * ) Notice: Subject to any disclaimer, the term of this patent is extended or adjusted under 35 U.S.C. 154(b) by 211 days.

(21) Appl. No.: 15/201,570

(22) Filed: Jul. 4, 2016

(65) Prior Publication Data

US 2018/0001542 A1    Jan. 4, 2018

(51) Int. Cl.
| | |
|---|---|
| B29C 53/58 | (2006.01) |
| B29C 70/32 | (2006.01) |
| B29C 70/24 | (2006.01) |
| C08J 5/04 | (2006.01) |
| C08J 5/24 | (2006.01) |
| B28B 11/24 | (2006.01) |
| B28B 23/02 | (2006.01) |
| B29B 15/12 | (2006.01) |
| B29C 35/02 | (2006.01) |
| B29K 105/08 | (2006.01) |

(52) U.S. Cl.
CPC ............ *B29C 53/58* (2013.01); *B28B 11/243* (2013.01); *B28B 23/02* (2013.01); *B29B 15/125* (2013.01); *B29C 35/02* (2013.01); *B29C 70/24* (2013.01); *B29C 70/32* (2013.01); *C08J 5/04* (2013.01); *C08J 5/24* (2013.01); *B29K 2105/08* (2013.01); *C08J 2300/24* (2013.01)

(58) Field of Classification Search
CPC .................................................... B29C 70/32
USPC ......................................................... 264/264
See application file for complete search history.

(56) References Cited

U.S. PATENT DOCUMENTS

| | | | | |
|---|---|---|---|---|
| 4,692,052 | A * | 9/1987 | Yee .......................... | E04C 5/163 403/13 |
| 5,038,545 | A * | 8/1991 | Hiendl ..................... | E04C 5/03 29/897.34 |
| 5,152,118 | A * | 10/1992 | Lancelot ................. | E04C 5/125 52/848 |
| 5,435,889 | A * | 7/1995 | Dietrich ................ | C04B 41/009 216/39 |
| 8,673,101 | B2 * | 3/2014 | Brandstrom ........... | B29D 23/00 156/173 |
| 2016/0076249 | A1 * | 3/2016 | Gibson ................. | B29C 70/521 52/834 |

* cited by examiner

*Primary Examiner* — Scott W Dodds
(74) *Attorney, Agent, or Firm* — Adrian D. Battison; Ade & Company Inc; Ryan W. Dupuis

(57) ABSTRACT

A composite reinforcing bar is formed by providing a reinforcing material supply of fiber strands ravings; a resin supply bath, and a puller for pulling the resin-impregnated reinforcing material through the resin bath. The material is wound on a holder, while the resin remains unset, rotated about its axis on a drive system so that the material is wrapped around a plurality of guides at spaced positions around the axis such that the fed length of the body is wrapped from one bar to the next to form bent portions of the body wrapped partly around each guide and straight portions between the guides. The guide surfaces are shaped by a machining, blasting or similar process to form projections and recesses which retain a roughness on the outside surface of the reinforcing bar during the curing action while supported on the surface. This arrangement can be used with an optional sand coating to prevent the sand particles from being compressed into the resin or body.

10 Claims, 8 Drawing Sheets

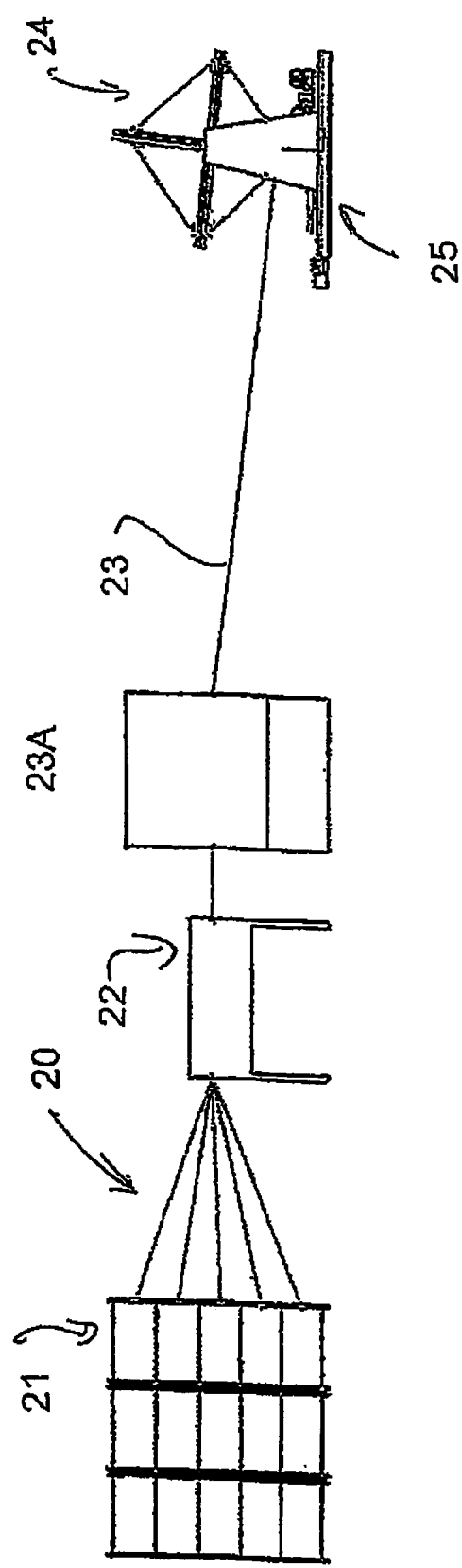

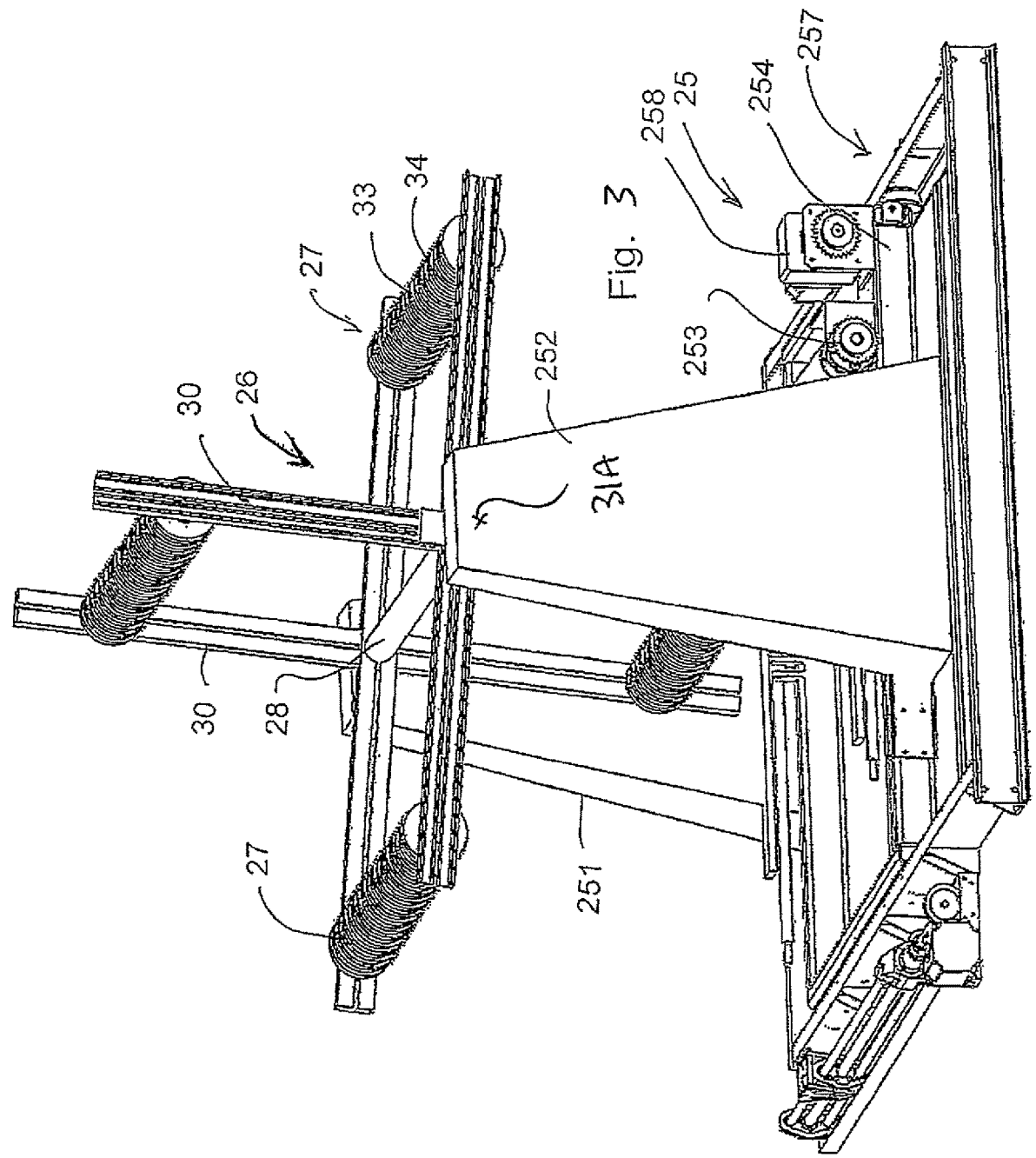

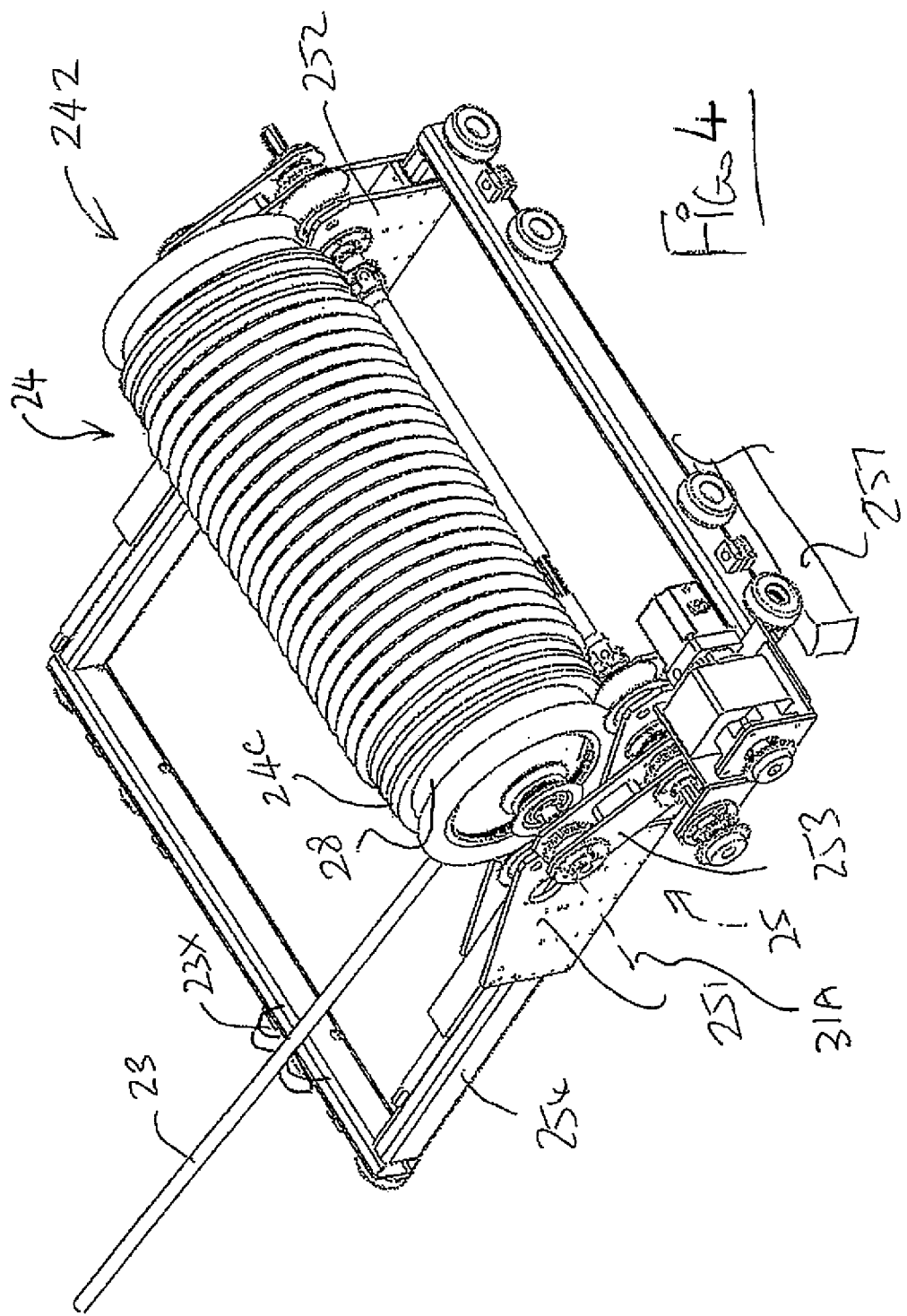

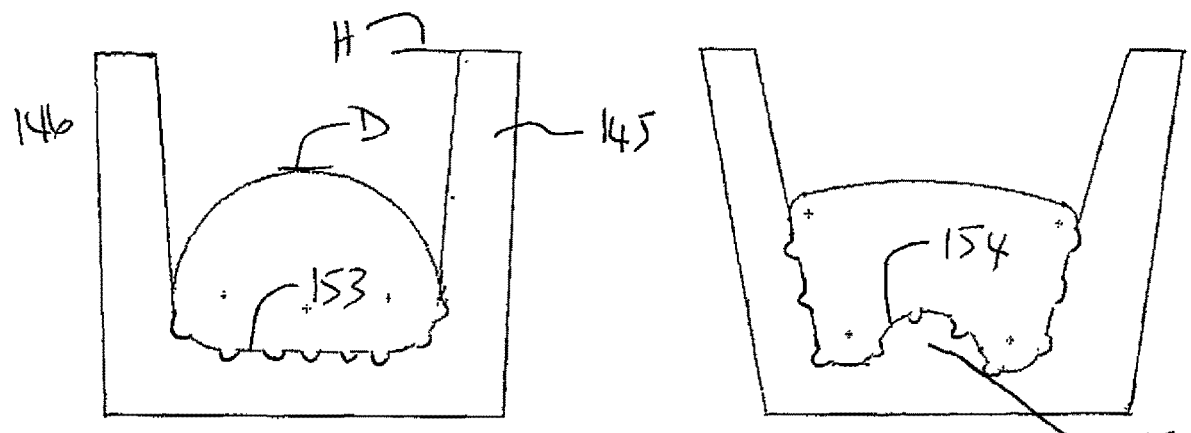
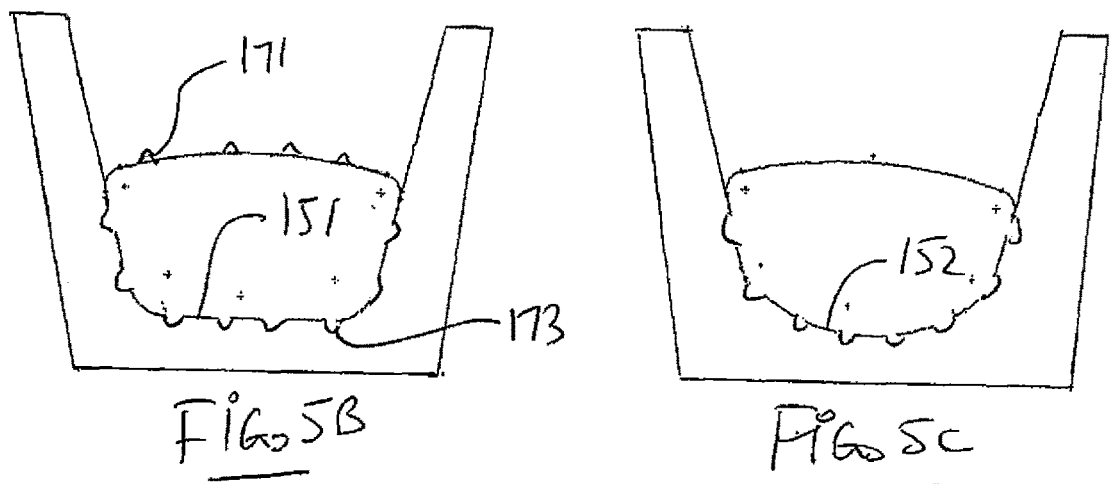
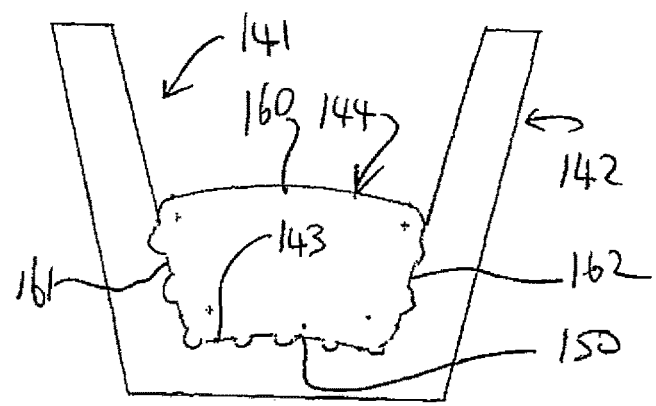

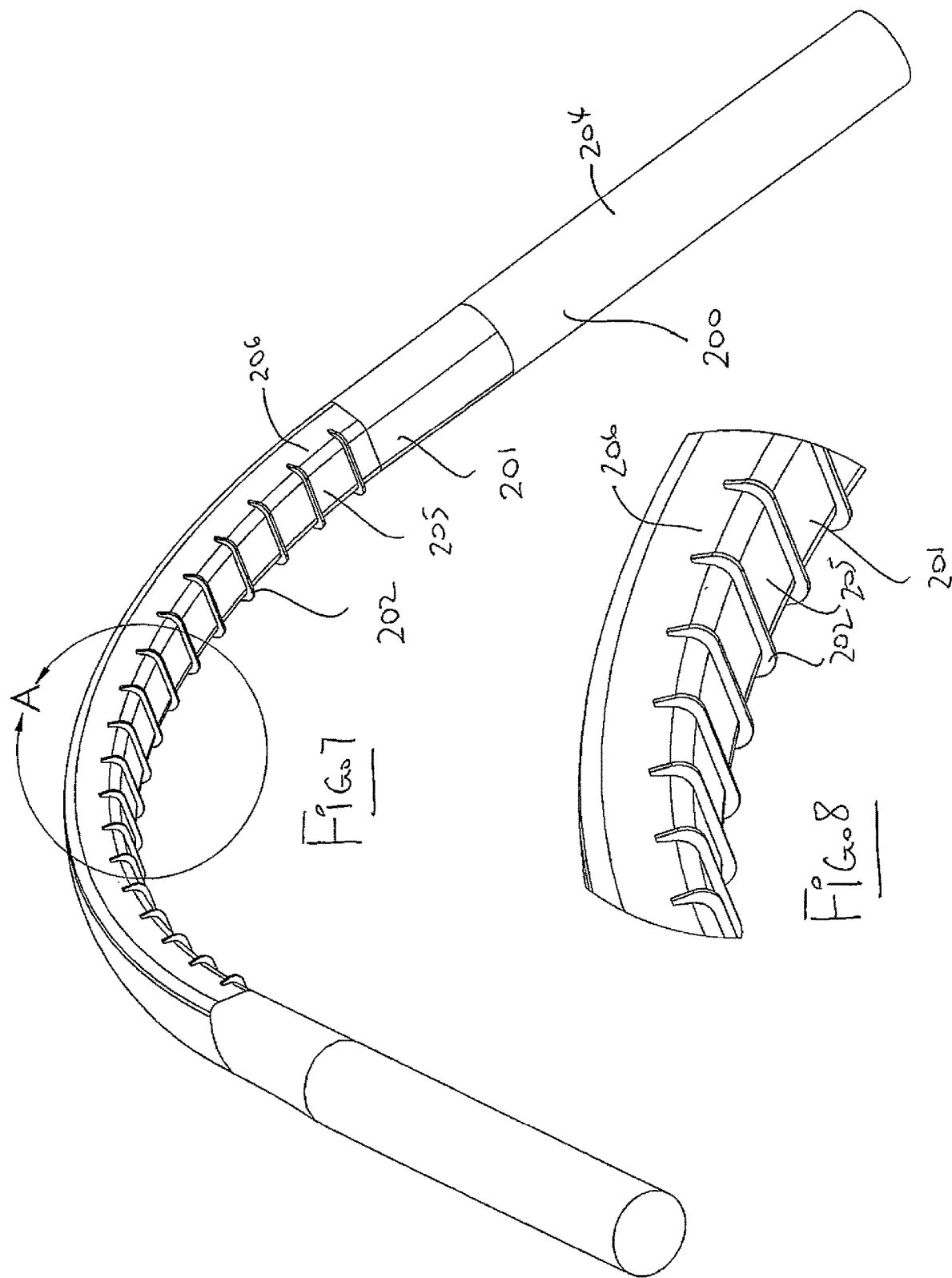

FIBER REINFORCED REBAR WITH SHAPED SECTIONS

The present invention relates a method for manufacture of fiber reinforced reinforcing bar or "rebar" where portions of the rebar along the length are curved or shaped out of the straight path of the bar.

The term "rebar" as used herein is intended to include solid bars and rods and also bars or rods which are hollow, that is both tubing and solid bars. The outside surface can be is but not necessarily of circular cross section. The rebar rods can be of any length.

BACKGROUND OF THE INVENTION

In U.S. Pat. No. 8,673,101 (Brandstrom) issued Mar. 18, 2014 is shown a composite reinforcing bar formed by providing a reinforcing material supply of fiber strands, a resin supply bath, and a puller for pulling the resin-impregnated reinforcing material through the resin bath. The material is wound on a holder, while the resin remains unset, rotated about its axis on a drive system so that the material is wrapped around a plurality of guides at spaced positions around the axis such that the fed length of the body is wrapped from one guide to the next to form bent portions of the body wrapped at least partly around each guide with optional straight portions between the bars. Each guide has peripheral grooves at longitudinally stepped positions which are shaped to mold the bent portions to a required bent shape. The holder is indexed along the axis to wrap a length of the bar. The bar is then cured either with the holder in place while the winding action continues or with the holder removed to a curing location when full.

This method can be used to form shaped portions at the ends of straight positions of the rebar where the guides are spaced around a winding axis to leave the straight portions between the guides or can be used to form a helical coil of the rebar where the guide itself is helical and engages and supports the rebar along the full length.

That is the guide or guides can engage the rebar along part of the length of the rebar all along the whole length of the rebar. The guides typically form a channel into which the rebar is placed prior to curing so that a surface of the channel supports the rebar during the curing action.

It is also known that the exterior surface of the rebar should carry in some cases a particulate material partly embedded in the exterior of the rebar so that the particulate material projects outwardly for engagement with the concrete or other material into which the rebar is embedded. This is known to provide an increased frictional engagement between the rebar and the concrete. Typically the particular material is sand but other particulate materials can be used.

SUMMARY OF THE INVENTION

It is one object of the present invention to provide a method for forming bars manufactured from fiber reinforced resin, where the bar includes at one or more section along its length a bend section. The resin can be thermosetting, thermoplastic, urethane or other materials known to persons skilled in this art According to a first aspect of the invention there is provided a method of reinforcing a cast material comprising:

forming an elongate body from longitudinally extending components of reinforcing fibers with the components arranged generally longitudinal to the body which is fed forwardly along its length;

wherein the body comprises a series of inner longitudinally extending components of reinforcing fibers arranged longitudinal to the bar and at least one helical wrapping of at least one component wrapped around the inner longitudinally extending components;

wetting the elongate body with a resin permeated through the fibers of the components;

providing a holder for receiving at least part of a length of the elongate body;

while the resin remains unset, rotating the holder about an axis so as to wrap the body around the holder;

providing relative movement in a direction longitudinal of the axis of the holder between the body as it is fed forwardly and the holder so as to wrap the body around the holder at stepped positions along the holder;

and curing or setting the resin of the body on the holder while the body remains wrapped thereon to form the bar;

wherein the holder comprises a guide surface for engaging at least a part of the length of the elongate body;

wherein the guide surface includes recesses so as to shape an outside surface of the elongate body during the curing to form projecting portions thereon.

Preferably the recesses have a depth of at least 0.005 inch and more preferably a depth in the range 0.020 to 0.250 inch.

The recesses can be in an organized pattern such as grooves in a single direction or in a cross pattern or can be random such as are obtained by particle blasting.

The recesses can be formed by many different processes by so as to define the depth of recess set forth above. For example the processes may include machining the guide surface to provide specific indentations. However more simply the recesses can be formed by sand blasting or blasting the surface with other particulate materials or by operation such as chemically etching, water jet or laser or mechanical hammer or etching.

In many cases the reinforcing bar can include a particulate material such as sand is applied onto the outside surface of the elongate body prior to engagement with the guide surface and curing. The intended operation of the recesses is that they be shaped and arranged so as to collect within the recesses some of the particles of the particulate material. In this way the recesses prevent all of the particles from being compressed into the resin in the area of the elongate body in contact with the guide surface.

Typically the rebar formed in the method above is used in the casting of a settable material such as concrete around the turns of the reinforcing bar in a form so as to bury the reinforcing bar in the cast material within the form and causing the cast material to set. As is well known, the concern with concrete is in regard to crack width and the arrangement in which projections are applied onto the surface assists in reducing this phenomenon to provide a better reinforced concrete product. That is the amount of rebar used in the product must limit crack width of cracks formed in the concrete, bearing in mind that all concrete forms such cracks, should be maintained at a crack width of less than 0.023 inch. The provision of the projecting portions on the inside surface of the rebar at the bends by providing the recesses in the guide surface acts to reduce the crack width while allowing a reduction in the number of reinforcing bars used. The projecting portions in the inside surface at the bends is used in conjunction with the conventional projecting elements provide on the remainder of the rebar surface by the applied particulate material.

In some cases each engagement member is spaced from the next by a distance so as to define a required length between each bent portion and the next. In other cases the elongate body is engaged by the guide surface of the guide member along its full length such as in the formation of a helical coil.

In a typical process, the wrapping is stopped when the holder is filled by side by side portions of the body arranged along the engagement members and wherein the resin is cured after the wrapping is stopped or during winding.

In most cases the guide surface comprises a groove or channel engaging a part only of the exterior surface of the elongate body and shaped to cup or surround a part of the surface of the elongate body along its length so that the groove or channel forms a shaping surface for the part of the elongate body engaged by the groove.

Preferably each engagement member is spaced from the next by a predetermined distance selected so as to define a required length between each bent portion and the next. In this way if the bar is cut immediately adjacent a bent portion, it defines a straight portion equal in length to that distance. However the bars can also be cut at different positions, for example half way between the bent portions in which case the length of the straight portion is still predetermined but is half the distance.

In some cases the wrapping is stopped after the holder is filled by side by side portions of the body arranged along the engagement members and the resin is cured or set after the wrapping is stopped with the holder removed. Preferably, to effect this separate curing, the holder is removed when the wrapping is stopped and the resin is cured with the holder removed. However curing may be effected on an ongoing process while the holder continues to rotate. This is preferably obtained by heating the holder for example by externally applied heat or by providing heating elements in the holder at the grooves which contain the separate turns of the bar.

Preferably the relative movement between the body and the holder is obtained by indexing the holder along the axis. This can be carried out by moving the holder along a mounting on the drive system.

Preferably the engagement members are arranged on the holder for adjustment of the positions thereof. In this way different dimensions of the straight portions and different angles of wrap can be achieved.

Preferably the engagement members are bars parallel to the axis.

Preferably the engagement members or bars each have a series of spaced grooves along the bar with each groove receiving a respective bent portion of the body.

Preferably the holder is arranged such that the number of guide members or bars can be changed. That is the number can be only two to provided 180 degree angle of wrap, can be four to provide 90 degree angle or can be other numbers with the angles changing accordingly.

Preferably the holder is arranged such that the guide members are adjustable radially of the axis. This changes the distance between the members or bars.

Preferably the holder is driven around the axis at an angular velocity which takes up the body at a constant linear velocity. That is the body is fed from a supply and is wound onto the holder at constant rate.

In an additional option, the body can be bent at second bend positions in an inverse direction to form second bent portions having angles curved in opposite directions to said bent portions by second guide members. In this option, the second bent portions are formed by wrapping the guide members or bars first and then inserting the second guide members, that is additional bars, while allowing inward movement of the original bars toward the axis to release lengths of the body to engage the additional bars.

In one arrangement, the body is cut at one bent portion to form a length of the body having one straight portion and one bent portion.

In another arrangement, the body is cut between the bars to form a u-shape rebar with two straight portions and one bent portion of 180 degrees between the two straight portions. This arrangement can be used by casting the u-shape rebar in a concrete panel with the straight portions within the panel and the bent portion exposed at one edge of the panel to form a lifting loop. In this case the method can include lifting the edge using the loops to raise the panel. In this case the loops are cut off after the panel is lifted into a required location. Because they are FRP rebar members, leaving an end at the surface of the panel has no difficulty with corrosion and hence does not need covering and coating.

Preferably the step of forming the reinforcing bar includes providing a series of inner longitudinally extending components of reinforcing fibers arranged longitudinal to the bar and providing at least one wrapping of at least one component wrapped around the inner longitudinally extending components.

This wrapping can be part of the structure in that it is intended to remain in place after the roving is complete and is in use. In the alternative the wrapping can be provided for the purpose of maintaining the integrity of the structure during the winding around the bars for the bending process. In this case, the wrapping may have no structural contribution in the finished rebar and is used merely to keep the bundle together, or even the material can be removed and discarded as a sacrificial material after curing is complete. In some cases particles can be adhesively attached to the exterior surface of the rebar when complete for added bonding to the material in which the rebar is embedded.

Where the wrapping is structural, it is typically helical. However longitudinally extending wrapping materials can be used. That is the material can either wind around the bar or be simply clad over it.

Where the wrapping is helical, preferably the wrapping comprises first and second helical wrapping or wrappings in opposed direction of wrapping with the resin being permeated through both the inner longitudinally extending components and through the wrappings to form a structure integrated by the permeated resin.

Preferably the bar has an outer surface portion which extends along at least most of the length of the bar and at the outer surface portion, the inner rovings have parts thereof between the first and second wrapping or wrappings exposed and bulged outwardly by tension applied by the wrapping or wrappings during curing, the bulged parts defining components of the outer surface portion of the bar which are thus rough and exposed for engaging a material to be reinforced so as to transfer longitudinal loads between the material to be reinforced and the inner ravings.

While the inner components are preferably or typically rovings, other material can be used or various types known to person skilled in the art. The inner components are preferably but not necessarily wrapped in one or both directions. Again the wrappings are preferably or typically rovings, but other material such as mat or thread can be used or various types known to person skilled in the art.

BRIEF DESCRIPTION OF THE DRAWINGS

FIG. 2 is a schematic side elevational view of the method of forming the reinforcing bar of FIG. 1.

FIG. 3 is an isometric view of the holder and drive system of FIG. 5.

FIG. 4 is an isometric view of a replacement holder for use in the method of FIG. 5 for forming helical coiled reinforcing bar.

FIGS. 5A to 5E comprise a series of transverse cross sections of a plurality of the guide channels of the holders from the figures above.

FIG. 7 is an isometric view of a reinforcing bar including a bend section formed by a guide using the method of the present invention where the guide member has recesses which are shaped as transverse grooves so as to form transverse ribs on the reinforcing bar on the inside surface of the bar.

FIG. 8 is an enlarged detail view of detail A of FIG. 7.

DETAILED DESCRIPTION OF THE INVENTION

Figure 1:
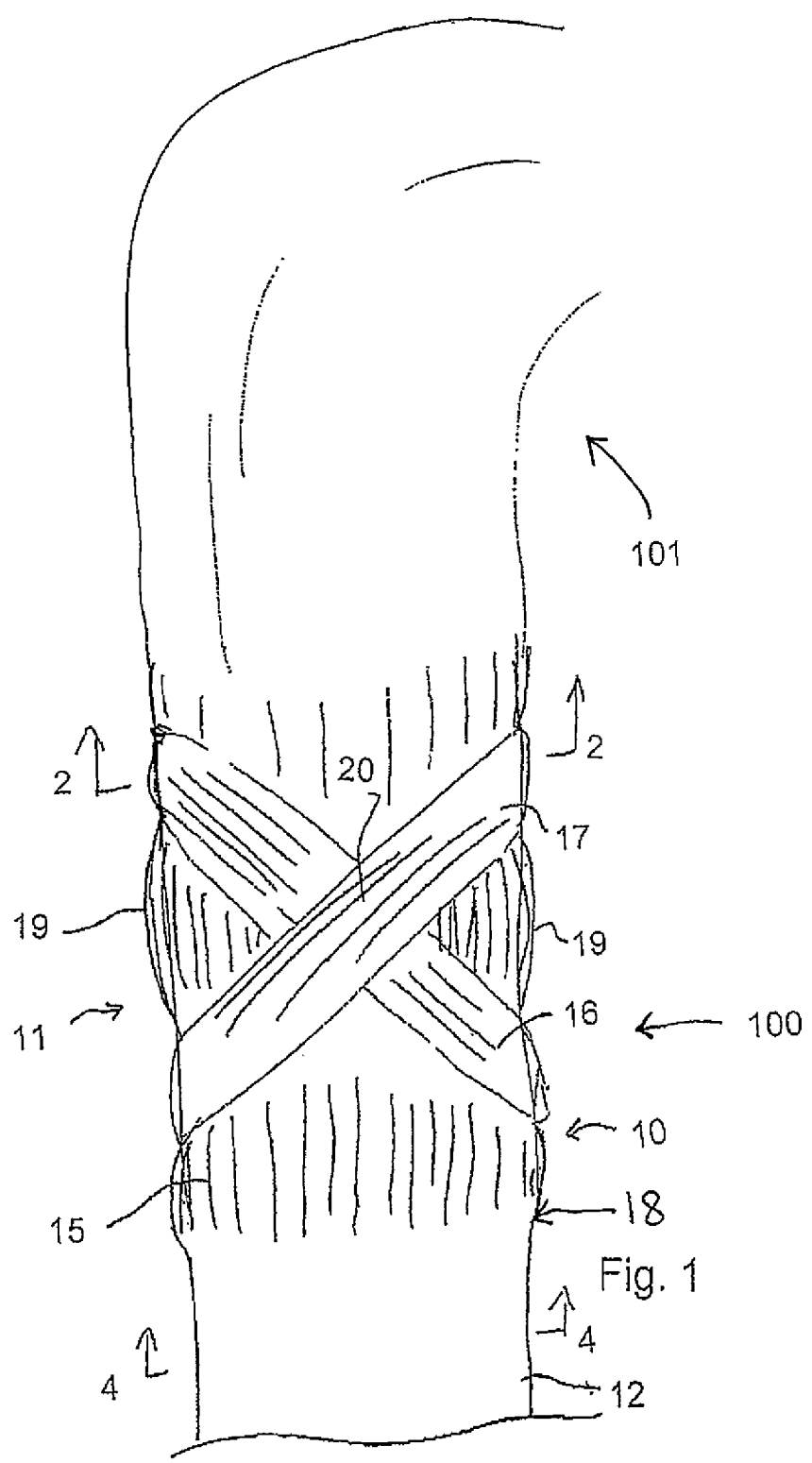
FIG. 1 is a side elevational view of a portion of a reinforcing bar manufactured by a method according to the present invention.

In FIG. 1 is shown a reinforcing bar generally indicated at 10. This is formed using the method described in detail hereinafter to form a straight section 100 and a bend section 101.

The basic bar structure is formed using the method shown and described in U.S. Pat. No. 8,673,101 of the present applicants, the disclosure of which is repeated as follows for completeness.

The bar 10 has a first section 11 extending along most of the length of the bar together with a second section 12 which extends a part of the length of the bar.

The bar is generally formed in continuous construction so that the first and second sections are repeated alternately. The length of the second section generally will comprise only a short portion relative to the length of the main section 1 so that for example the main section may be 12 feet long and the second section only 6" long. The reinforcing bar is formed solely from a resin material 14 which is permeated through to sections of reinforcing fibers including longitudinal reinforcing fibers 15 and wrapping reinforcing fiber 16, 17.

The longitudinal reinforcing fibers 15 constitute the main volume of the structure so that typically the fiber content may be constituted as longitudinal fibers 90 to 97% and wrapping fibers 3 to 10%, where the resin content can be of the order of 20 to 30% by weight.

The structure in the area of the portion 11 is formed without any compression of any of the fibers by a pultrusion process. Thus neither the inner core formed by the longitudinal fibers 15 nor the outer wrapping 16 and 17 pass through a die structure so that they are free to take up their positions as determined by the tensions in the material when formed.

The resin may be a two part resin which sets without heat but more preferably is a thermosetting resin which is heated by any one of a number of available heating techniques such as microwave heating, forced air heating, infra-red heating, RF-heating, or induction heating where at least one metal fiber is included in the structure to absorb the electromagnetic energy. Thus the heat is applied to the structure to effect curing of the resin without contact by the heating device on the structure. In this way the fibers in the first section 11 are free to take up their position depending upon their tension and they take up a position within the resin so that the resin extends both through the longitudinal fibers and the wrapping fibers.

The absence of any compression by the provision of any form of die through which the core of longitudinal fibers passes ensures that the wrapping fibers 16 and 17 apply pressure onto those parts of the longitudinal fibers which are contacted by the wrapping fibers squeezing those longitudinal fibers inwardly and causing bulging of the longitudinal fibers in the sections 19. Thus between each wrapped strip of fibers there is a portion of the longitudinal fibers which is squeezed and bulged outwardly so that it projects to a position which is preferably slightly proud of the outside surface of the wrapping fibers.

The wrapping fibers are of course spaced in the longitudinal direction by a helical wrapping action so that the width of the wrapping fibers is less than the width of the bulged intermediate sections 19.

Typically the wrapping fibers in each direction can be spaced of the order of 1 to 3 to the inch. However a wider or lesser spacing may be used provided the longitudinal fiber are properly controlled and provided there is enough space to ensure bulging between the wraps.

The wrapping fibers may be wrapped as a single roving in a single start wrapping process or as multiple rovings applied in a multi-start wrapping process. In such a multi start process the number of ravings side by side may be in the range 2 to 10. The number of ravings or the thickness of the roving at the wrapping position may vary depending on the diameter of the core.

The wrapping action occurs in both directions so that the wrapping fibers overlap one another as they cross as shown for example at 20. In this way the bulged sections are generally diamond shape in front elevation and are squeezed at the top and bottom by the wrapping action of the wrapping fibers. Thus the bulging sections 19 are individual and separated by the wrapping fibers and yet the longitudinal fibers are properly contained and held into the structure by the wrapping at top and bottom of the bulging sections.

The provision of the wrapping or wrappings symmetrically in both directions tends to contain and locate the inner longitudinal ravings and maintain them in the longitudinal direction even when tension is applied. Thus the full strength of the longitudinal fibers in the longitudinal direction is maintained and is not reduced or compromised by any tendency of the longitudinal fibers to twist. Any such twisting of the longitudinal fibers can significantly reduce strength by applying loads sequentially to different fibers leading to sequential failure. In addition the wrappings in opposite directions accommodate torque applied to the rod in both directions.

The bulging sections 19 are thus presented on the outside surface 18 for engagement with material within which the bar is embedded. Thus if the material to be reinforced is concrete, the concrete sets around the reinforcing bar and engages the bulging sections 19. Longitudinal loads from the concrete to the reinforcing bar are therefore transferred to the bulging sections 19 and not only to the wrapping section 16 and 17. The wrapping sections because of their angle to the longitudinal direction have less ability to accommodate longitudinal tension than do the longitudinal fibers which are longitudinal and continuous. Thus transferring the loads in the longitudinal direction to the bulged sections 19 ensures that the loads are transferred into the longitudinal fibers and avoid transference to elements which can be moved longitudinally or stripped from the outside surface 18. The bulge sections 19 cannot of course move longitudinally since they are part of longitudinal fibers.

The fact that the resin is permeated throughout both the longitudinal fibers and the wrapping fibers to the outside surface 18 ensures that the wrapping fibers are bonded effectively into the structure.

In FIGS. 2 and 3 is shown the method for manufacturing the rebar having the straight portion 100 and the bend portion 101. This method includes a conventional system 20 for forming an elongate body 23 from rovings of reinforcing fibers arranged generally longitudinal to the body which is fed forwardly along its length from a supply assembly 21. The body 23 is wetted with an unset curable resin permeated through the rovings in a bath 22. The body 23 is fed forwardly by a drive and guide system 23X and is fed from this system at a predetermined speed either by being driven forwardly or more generally by controlling the feed from the supply 21 to ensure constant supply in order to try to maintain a predetermined tension, bearing in mind that the speed may be varied depending on various factors.

The body 23 is fed from the former 22 to a holder or reel 24 for receiving a length of the elongate body mounted on a drive system 25 for rotation about an axis. The holder comprises generally a reel 26 with a plurality of bars 27 arranged at spaced positions around the axis of the reel.

Thus the holder comprises a hub 28 including a plurality of transverse rails 30 extending outwardly for supporting the bars 27 at positions spaced outwardly or the axis of the hub. The rails 30 support a plurality of the guide members or bars 27 at spaced positions around the axis 31A. The guide members or bars may be parallel to the axis 31A but also can be inclined to the axis so as to generate portions of different lengths between the bars.

Each bar 27 is generally cylindrical with an outer surface 33 for receiving the rebar body 23 to be wrapped around the reel. Each bar 27 has on its outer surface a series of axially spaced grooves 34 with each groove 34 having a radius of curvature and a width arranged to match the outer periphery of the rebar body 23. Thus as the reel is rotated about its axis, the rebar body is laid into each groove 34 in turn along the bars 27 with the grooves holding the rebar body at a specific position on the bar 27 and spaced from the next wrapping of the rebar body. Thus there is no contact between each wrap and the next. In order to maintain the rebar body confined into a generally cylindrical shape, at least one wrapping of at least one component is wrapped around the inner rovings.

This wrapping can be part of the structure in that it is intended to remain in place after the roving is complete and is in use. In the alternative the wrapping can be provided for the purpose of maintaining the integrity of the structure during the winding around the bars for the bending process. In this case, the wrapping may have no structural contribution in the finished rebar and is used merely to keep the bundle together, or even the material can be removed and discarded as a sacrificial material after curing is complete. In some cases particles can be adhesively attached to the exterior surface of the rebar when complete for added bonding to the material in which the rebar is embedded.

Where the wrapping is structural, it is typically helical. However longitudinally extending wrapping materials can be used. That is the material can either wind around the bar or be simply clad over it.

Figure 6:
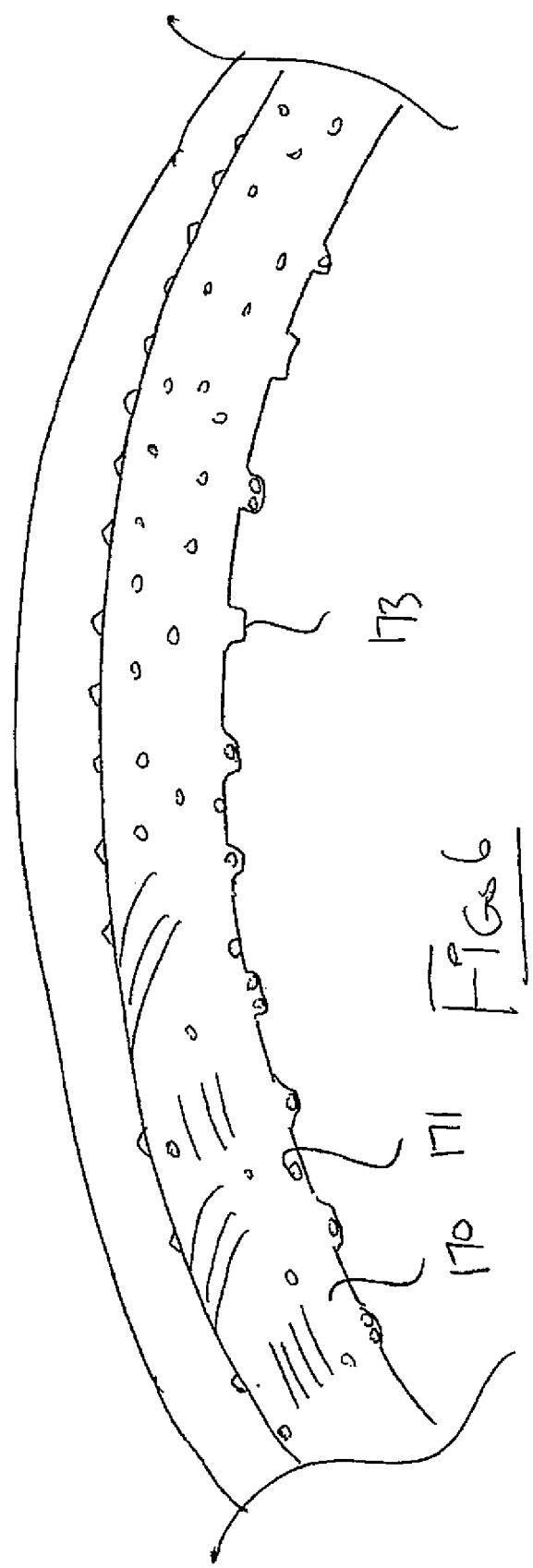
FIG. 6 is a longitudinal cross-sectional view of the guide channel of one of the channels of FIGS. 5A to 5E.

The bars 27 have a radius of curvature around the bar arranged to receive and to form a respective bent portion of the body. Thus in the figures where the bars 27 are shown as cylindrical, the radius of curvature of the cylinder matches the intended curvature of the required bent portion to be formed. It will be appreciated that the bar 27 only contacts the rebar body over a portion of the periphery of its outer surface 33 which will be roughly 90 degrees in the arrangement using four bars as shown in FIG. 6. This portion of the surface 33 must match the shape of the bent portion to be formed. The remaining part of the bar around the remaining 270 degrees can be of any shape since it has no contact with the rebar body 23.

While the resin remains unset, the body is wrapped around the holder such that the fed length of the body is wrapped from one guide member to a next guide member such that bent portions of the body are wrapped partly around each guide member and straight portions of the body extend between each guide member and the next. Thus each guide member has angularly extending axially separated surface portions which are shaped to mold the bent portions to a required bent shape. The drive system 25 provides both rotation of the reel by driving the hub 28 around the axis 31A but also provides relative movement between the rebar body 23 as it is fed forwardly and the holder 24 so as to wrap the body 23 around the bars 27 of the holder at the stepped positions along the bars 27 defined by the grooves 34.

The holder when filled, that is each of the grooves 34 has been engaged by a portion of the rebar body, the resin in the rebar body is cured on the holder while the body 23 remains wrapped on the holder. That is the wrapping is stopped when the holder is filled by side by side portions of the body arranged along the guide members and the resin is cured after the wrapping is stopped and the holder removed and placed in a suitable oven or other heating system.

It will be appreciated that each bar 27 is spaced from the next by a distance so as to define a required length between each bent portion and the next. For this reason the position of the bars 27 along the rails 30 is adjustable for example by defining a guide track and locking system which allows the bars to slide inwardly while being set at the required position parallel to the axis 31A.

The drive system 25 includes towers 251 and 252 for supporting respective ends of the hub 28, or the hub may be cantilevered from one tower. The hub is driven by a drive train 253 mounted on a base frame 254 The relative movement between the rebar body 23 and the holder 24 is obtained by guiding the rebar body 23 at a fixed feed position defined by the drive and guide system 23X and by indexing the holder 24 along the axis 31A. The indexing movement is obtained, as shown in FIG. 4, by moving the frame 254 carrying the hub 28 along an outer support frame 257 by an indexing motor 258 including a suitable drive system which may be a worm, chain or rack or other mechanical drive system. The indexing movement across the frame 257 can be constant or can be stepped as required, bearing in mind that the rebar body is laid into grooves and thus held and guided by those grooves to be properly positioned on the holder at the axially spaced locations defined by the grooves. The holder is thus driven around the axis with constant torque for applying constant tension to the rebar body 23. In order to obtain constant linear wind-up speed, the angular velocity of the hub 28 and therefore the bars 27 around the axis must change at different angular positions around the axis as the radial position of the winding location on the respective bar changes inwardly and outwardly of the axis.

When filled, the holder can be simply removed from the drive system by removing the hub from the towers and moving away the holder to the oven. The holder can then be replaced by a second empty holder of a set of holders of a suitable number to allow continuous production where the filled holders are in curing while another empty holder is in winding.

The holders can be of various diameters allowing various locations of the bars 27. For example a reel can have a diameter as much as 25 feet with many different locations of the bars being possible to provide many different numbers and locations of the bars for different angles of wrap for the bent portions and different lengths of straight portions. Typically the rebar body is bent at a radius of curvature which is matched to the diameter of the rebar body so that the outside surface 33 of the bars 27 is typically always the same diameter regardless of the angle of wrap. This diameter of the surface of the bar is of course matched to the width of the grooves for the diameter of rebar being formed. Different reels are therefore provided for different diameter rebar such as 0.5 inch, 1.0 inch or 1.5 inch and that reel can carry out all required shapes for the dedicated rebar diameter to which it is designed.

As explained previously and shown in FIG. 1, the step of forming the reinforcing bar includes providing a series of inner rovings of reinforcing fibers arranged longitudinal to the bar, providing a first helical wrapping or wrappings of at least one roving wrapped around the inner rovings in a first direction of wrapping, and providing a second helical wrapping or wrappings of at least one roving wrapped around the inner rovings in a second opposed direction of wrapping with the resin being permeated through both the inner rovings and through the wrappings to form a structure integrated by the permeated resin.

The bar thus has an outer surface portion which extends along at least most of the length of the bar and at the outer surface portion, the inner rovings have parts thereof between the first and second wrapping or wrappings exposed and bulged outwardly by tension applied by the wrapping or wrappings during curing, the bulged parts defining components of the outer surface portion of the bar which are thus rough and exposed for engaging a material to be reinforced so as to transfer longitudinal loads between the material to be reinforced and the inner rovings.

While the inner components are preferably or typically rovings, other material can be used or various types known to person skilled in the art. The inner components are preferably but not necessarily wrapped in one or both directions. Again the wrappings are preferably or typically rovings, but other material such as mat or thread can be used or various types known to person skilled in the art.

Turning now to the method of forming a helical reinforcing bar shown in FIG. 4, there is shown an alternative arrangement of the holder or reel 24. Thus the body 23 is fed from the former 22 to the holder or reel 242 for receiving a length of the elongate body mounted on a drive system 25 for rotation about an axis.

In this embodiment the elongate body 23 is laid into a channel wound around the hub 28 to form a helical guide groove 24C which is continuous along the hub and is laid at a constant pitch.

The drive system 25 includes towers 251 and 252 for supporting respective ends of the hub 28, or the hub may be cantilevered from one tower. The hub is driven by a drive train 253 mounted on a base frame 254 The relative movement between the rebar body 23 and the holder 24 is obtained by guiding the rebar body 23 at a fixed feed position defined by the drive and guide system 23X and by indexing the holder 242 along the axis 31A. The indexing movement is obtained by moving the frame 254 carrying the hub 28 along an outer support frame 257 by motor and mechanical drive system (not shown). The indexing movement across the frame 257 forms a helix of constant pitch, bearing in mind that the rebar body is laid into the constant helical guide groove 24C and thus is held and guided by the groove to be properly positioned on the holder at the helical position defined by the grooves. The holder is thus driven around the axis at constant velocity and thus with constant torque for applying constant tension to the rebar body 23.

While the resin remains unset, the body is wrapped around the holder such that the fed length of the body is wrapped into the helical groove which is shaped to mold the body 23 to the required helical shape. The drive system 25 provides both rotation of the reel by driving the hub 28 around the axis 31A but also provides relative movement between the rebar body 23 and the holder 24 as it is fed forwardly so as to wrap the body 23 around the guide of the holder.

Thus the body 23 provides an elongate body from longitudinally extending components of reinforcing fibers with the components arranged generally longitudinal to the body and the body 23 is fed forwardly along its length at the guide 23X.

As previously explained, the body comprises a series of inner longitudinally extending components of reinforcing fibers arranged longitudinal to the bar and at least one helical wrapping of at least one component wrapped around the inner longitudinally extending components.

As previously explained and shown in FIG. 2, the elongate body is wetted with an unset curable resin permeated through the fibers of the components.

The holder 242 for receiving a length of the elongate body includes a continuous helical support channel arranged around a longitudinal axis of the holder to hold the body 23 in the helical condition while the resin remains unset and the holder is rotated about the longitudinal axis so as to wrap the body around the holder and to lay the body into the continuous helical support channel 24C. The continuous helical support channel 24C is arranged with a pitch substantially equal to a diameter of the body so that the turns of the body are laid substantially directly side by side with merely sufficient room for clearance to prevent bonding of one turn to the next during curing. The side by side location of the turns reduces the length required of the holder to the minimum. The holder can be heated to effect the setting action either by external radiation or by internal heat sources (not shown).

The relative movement in a direction longitudinal of the axis of the holder between the body as it is fed forwardly and the holder so as to wrap the body around the holder into the continuous helical support channel is provided by the frame 257 and the drive (not shown).

The resin of the body is cured on the holder while the body remains wrapped thereon to form the helical reinforcing bar from the cured body. The helical reinforcing bar consists solely of the body when cured so that no additional material is added and the body laid on the holder is simply cured. For this purpose the holder is removed to a separate location where heat can be applied to effect the curing. While this occurs a new holder is applied to the support frame for continuation of the winding action. Alternatively the curing action can also take place on the holder.

As shown in FIGS. 5 and 6, the outside surface 142 of the guide generally indicated at 141 forms a channel or groove into which the outside surface 143 of the rebar body 144 sits during the curing action. In some cases where the intention is to form a generally cylindrical body as the rebar even at the bend portions, the outside surface of the groove at the bottom of the groove will have a generally semi-cylindrical shape. In all cases the groove 142 has side walls 145 and 146 which are higher at H than a depth at D of the rebar so as to contain the rebar as it is wrapped and to ensure that it is properly separated from the next adjacent rebar, since any contact will bond the two turns together.

However as shown in the FIGS. 5A to 5E, the curvature of the groove is typically different from the semi-circular shape and is designed to form a required profile on the formed rebar surface.

In particular the shapes are arranged so as to reduce the stresses in the reinforcing fibers as the bending action takes place.

In FIG. 5A, there is provided a convex shape at the surface 150 which forms a concave shape in the bottom of the rebar generally following the curvature of an outer surface 160.

In FIG. 5B, the surface 151 is generally flat. In FIG. 5C, the surface 152 is convex. In all of these arrangements the surface of the groove which engages the rebar is narrower than the width of the rebar so as to confine and engage the sides of the rebar at side walls 161 and 162.

In FIG. 5D, the bottom surface is concave similar to that of FIG. 5B but the width of the groove is wider relative to the width of the rebar so that the rebar sits up from the bottom surface as convex curvature which is not engaged with the sides of the groove.

In FIG. 5E, the shape is similar to that of FIGS. 5B and 5C but there is provided a central rib 155 in the bottom surface 154 so as to push up the center of the rebar at the bottom. This shape acts to reduce the forces on the fibers at the bottom by pushing those fibers upwardly into the rebar.

It will be appreciated in this regard that around the guide, the fibers at the outer radius are required to run a longer path than those at inner radius, which acts to distort the shape of the rebar in the groove. These outside surfaces of the groove shapes tend to reduce this distortion.

As best shown in FIG. 6, the body has applied to the outside surface 170 a plurality of particles 171 which are typically sand. These particles are applied randomly and attach to the sticky resin prior to its curing or setting action. Where the reinforcing bar at is not in contact with the guide surface of the guide grooves, these particles remain partly embedded at the outside surface 143 with a part of the particle projecting outwardly. It will be appreciated that there are no forces compressing the particles into the bar at these locations.

However at the surfaces 150, 161 and 16, the particles would typically be compressed into the resin in the event that the surface is smooth or flat.

However in this arrangement the surfaces are machined or processed to provide a series of recesses 173. The recesses and projections can be formed in many different processes as set forth above. These processes generate a depth of the recesses relative to the projections of the order of the value described above. The width of the projections of recesses as shown in FIG. 6 is sufficient to receive at least one and typically a number of the particles 171 which are gathered together into the recesses as shown in FIG. 6.

In this way, instead of the particles being compressed into the resin, the particles remain at the surface projecting outwardly from the surface in the finished product after curing, in view of the location of those particles during the forming action. In addition the resin is forced into the recesses so that, where no particles are forced into a recesses on the exterior surface the recess is filled with resin which forms a projection on the outer surface. Thus the rebar retains a roughness in the inside surfaces of the curved or bent sections even in the event where the particles are not used or in the areas between the particles.

In some cases no sand or particles are provided so that the projections on the inside surfaces are wholly formed of the resin.

The guide surface is typically curved to a circular radius in the area wrapped by the bar but other shapes are possible both as elliptical or other non-constant curves depending upon the required shape of the bend in the bar.

FIGS. 7 and 8 show an isometric view of a reinforcing bar 200 including a bend section 201 formed by a guide using the method of the present invention. The bar includes straight sections 204 formed between the guides. These can include projections formed by the applied particulate as is previously known, or the particulate can be omitted as shown. The guide member around which the bend sections are wrapped has recesses which are shaped as transverse grooves so as to form transverse ribs 202 on the reinforcing bar on the inside surface of the bar. These are applied both in the bottom or inner surface 205 of the bar and also partly into the side walls 206 of the bar. These can be provided simply as grooves as shown or there may also be machined or formed recesses or indentation between the grooves as a generally random pattern to receive and contain resin to general projections in addition to the ribs or to contain the particular if used. Thus the ribs 202 will also contain the particulates if used.

Figures 9, 10:
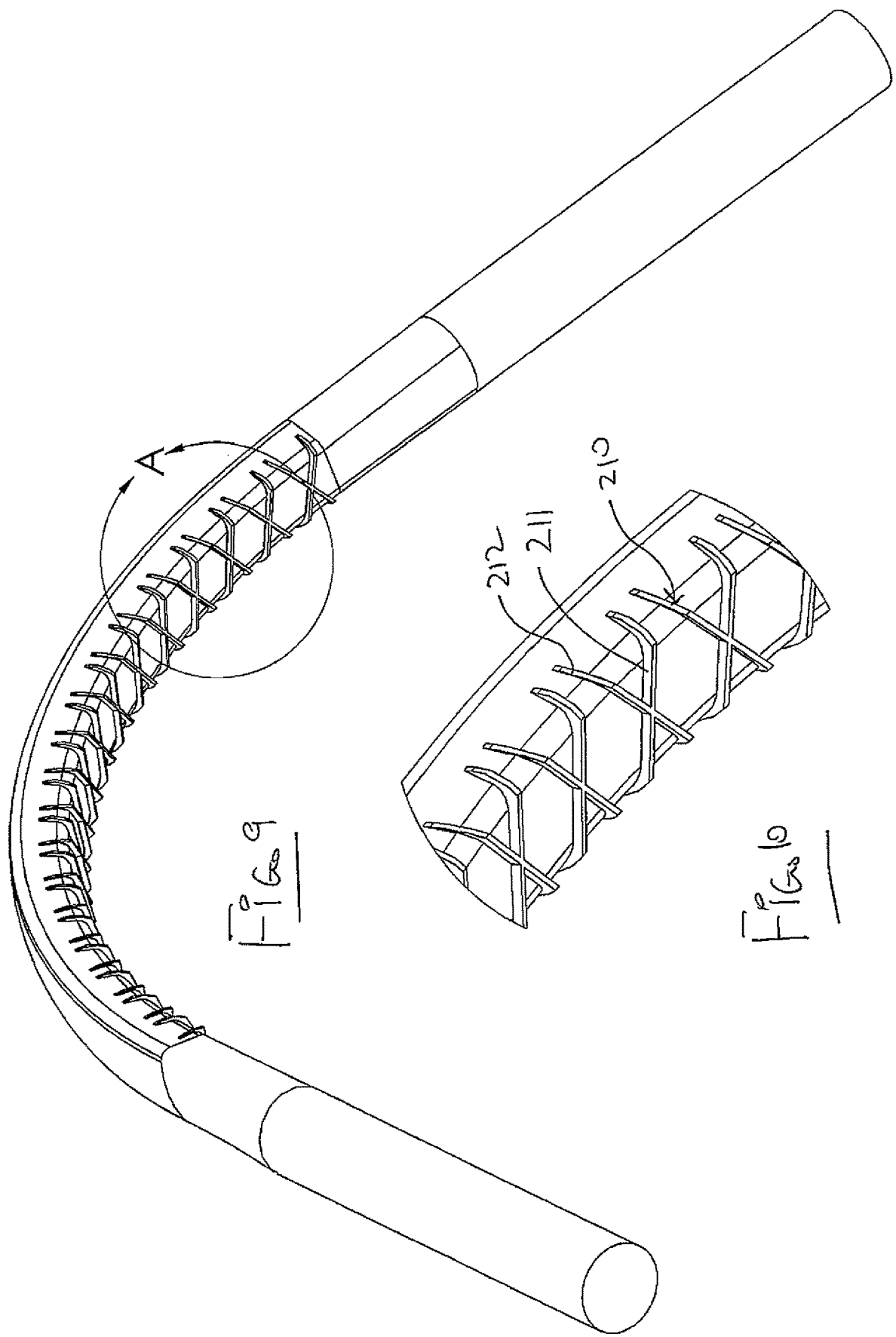
FIG. 9 is an isometric view of a reinforcing bar including a bend section formed by a guide using the method of the present invention where the guide member has recesses which are shaped as intermeshing diagonal grooves so as to form diagonal ribs on the reinforcing bar on the inside surface of the bar.
FIG. 10 is an enlarged detail view of detail A of FIG. 9.

FIGS. 9 and 10 show a construction as described above in relation to FIG. 7 but where the ribs generally indicated at 210 are formed as an "X" with two diagonal intersecting ribs 211 and 212.

These ribs also can take up some material on the inside surfaces so as to reduce stresses in the structure as the bend is formed.

The invention claimed is:
1. A method of forming an elongate bar comprising:
forming an elongate body from components of reinforcing fibers extending in a longitudinal direction of the elongate body with the components arranged generally longitudinal to the elongate body which is fed forwardly along its length;
wetting the elongate body with a resin permeated through the fibers;
conveying the elongate body to a plurality of guide channels;
each guide channel being generally U-shaped in cross section to define a base, first and second side walls and an open face;
each guide channel being curved around an axis transverse to the elongate body so that the base is inward and the open face is outward;
wherein the guide channels are mounted at angularly spaced positions around a holder which is rotated about an axis so as to wrap the elongate body around the holder, thus placing the elongate body into the guide channels so that, at each guide channel, a first part only of a periphery of the elongate body is engaged with the base and side walls of the guide channel with a second part of the periphery of the elongate body facing outwardly of the open face and thus being free from engagement with the guide channel;

wherein each guide channel includes a plurality of transverse grooves therein extending at least across the base from the first side wall to the second side wall;

curing or setting the resin of the elongate body while supported on the guide channels to form the bar;

the grooves acting, during the curing, to receive portions therein of said elongate body at said first part of the periphery of the elongate body, which portions are diverted into the grooves to form projecting portions on the elongate body;

the second part of the periphery of the elongate body at the open face being free from engagement with the guide channel so that the elongate body is formed without diversion by contact with the guide channel;

and removing the bar when cured or set from the guide channels.

2. The method according to claim 1 wherein the grooves in each guide channel extend across the base and partly into the side walls.

3. The method according to claim 1 wherein the grooves in each guide channel extend at right angles to the longitudinal direction of the elongate body and are spaced each from the next at longitudinally spaced positions along the elongate body.

4. The method according to claim 1 wherein the elongate body comprises a series of inner longitudinally extending components of reinforcing fibers and at least one helical wrapping of at least one component wrapped around the inner longitudinally extending components.

5. The method according to claim 1 wherein the grooves have a depth in the range 0.020 to 0.250 inch.

6. The method according to claim 1 wherein there is provided relative movement in a direction parallel to the axis of the holder, as the elongate body is fed forwardly, between the elongate body and the holder with the guide channels thereon so as to wrap the elongate body around the holder and into the guide channels at stepped positions along the holder.

7. A method of forming an elongate bar comprising:

forming an elongate body from components of reinforcing fibers extending in a longitudinal direction of the elongate body with the components arranged generally longitudinal to the elongate body which is fed forwardly along its length;

wetting the elongate body with a resin permeated through the fibers;

conveying the elongate body to a plurality of guide channels;

each guide channel being generally U-shaped in cross section to define a base, first and second side walls and an open face;

each guide channel being curved around an axis transverse to the elongate body so that the base is inward and the open face is outward;

wherein the guide channels are mounted at angularly spaced positions around a holder which is rotated about an axis so as to wrap the elongate body around the holder, thus placing the elongate body into the guide channels so that, at each guide channel, a first part only of a periphery of the elongate body is engaged with the base and side walls of the guide channel with a second part of the periphery of the elongate body facing outwardly of the open face and thus being free from engagement with the guide channel;

wherein each guide channel includes a plurality of transverse grooves therein extending at least across the base from the first side wall to the second side wall;

wherein the grooves in each guide channel extend across the base and partly into the side walls;

wherein the grooves in each guide channel extend at right angles to the longitudinal direction of the elongate body;

wherein the grooves are spaced each from the next at longitudinally spaced positions along the elongate body;

curing or setting the resin of the elongate body while supported on the guide channels to form the bar;

the grooves acting, during the curing, to receive portions therein of said elongate body at said first part of the periphery of the elongate body, which portions are diverted into the grooves to form projecting portions on the elongate body;

the second part of the periphery of the elongate body at the open face being free from engagement with the guide channel so that the elongate body is formed without diversion by contact with the guide channel;

and removing the bar when cured or set from the guide channels.

8. The method according to claim 7 wherein the elongate body comprises a series of inner longitudinally extending components of reinforcing fibers and at least one helical wrapping of at least one component wrapped around the inner longitudinally extending components.

9. The method according to claim 7 wherein the grooves have a depth in the range 0.020 to 0.250 inch.

10. The method according to claim 7 wherein there is provided relative movement in a direction parallel to the axis of the holder, as the elongate body is fed forwardly, between the elongate body and the holder with the guide channels thereon so as to wrap the elongate body around the holder and into the guide channels at stepped positions along the holder.

* * * * *